United States Patent [19]
Finney

[11] 3,747,722
[45] July 24, 1973

[54] HYDRAULIC AUXILIARY DRIVE FOR VEHICLES
[76] Inventor: Frank E. Finney, 2744 Felicita Rd., Escondido, Calif. 92025
[22] Filed: June 10, 1971
[21] Appl. No.: 151,722

[52] U.S. Cl. ............................ 180/66 R, 180/44 F
[51] Int. Cl. ........................ B60k 7/00, B60k 23/08
[58] Field of Search ............... 180/66 R, 66 F, 44 F, 180/44 M, 10

[56] References Cited
UNITED STATES PATENTS

| | | | |
|---|---|---|---|
| 3,532,177 | 10/1970 | Herrman | 180/66 R |
| 3,415,334 | 12/1968 | Vriend | 180/66 R |
| 2,650,573 | 9/1953 | Hickman | 180/66 R |
| 3,075,598 | 1/1963 | Pheneger | 180/66 R X |
| 3,430,722 | 3/1969 | Budzich | 180/66 R X |
| 3,447,619 | 6/1969 | Nodwell et al. | 180/66 R X |
| 2,516,662 | 7/1950 | Vickers et al. | 180/66 R |

FOREIGN PATENTS OR APPLICATIONS

| | | | |
|---|---|---|---|
| 1,133,019 | 11/1956 | France | 180/66 R |

Primary Examiner—Robert J. Spar
Attorney—Carl R. Brown and Neil F. Martin

[57] ABSTRACT

A hydraulic auxiliary drive system which derives power from the driven wheels of a vehicle and applies that power to the normally non-driven wheels of the vehicle, or of a trailer towed by the vehicle. The self-contained closed system includes hydraulic pump units which are simply bolted on the existing driven wheel mountings, and hydraulic motors which are bolted on the wheels to be driven. An actuating valve engages or disengages the drive and selection means is provided for applying the auxiliary power to the vehicle or trailer, as required. When not in use the system does not affect normal performance of the vehicle.

10 Claims, 4 Drawing Figures

Patented July 24, 1973

3,747,722

INVENTOR.
FRANK E. FINNEY

BY Brown & Martin

ATTORNEYS

HYDRAULIC AUXILIARY DRIVE FOR VEHICLES

BACKGROUND OF THE INVENTION

In vehicles in which all wheels are required to be driven at certain times for added traction, various means have been devised for applying power to the normally non-driven wheels. One particular type of four wheel drive vehicle uses an elaborate transmission to shift between two and four wheel power positions. Some vehicles of this basic type necessitate stopping the vehicle and engaging the drive externally. When the four wheel drive is not in use, the added mechanism causes an undesirable drag on the power of the vehicle. Certain low speed vehicles, particularly for heavy hauling or material handling, have been built with individual hydraulic motors in each wheel, powered from a common pressure source. This results in a specialized and expensive vehicle with a limited field of use.

SUMMARY OF THE INVENTION

The auxiliary drive system described herein is adaptable to many existing vehicles with a pair of driven wheels, and provides power for selectively driving the other wheels of the vehicle, or the wheels of a trailer towed by the vehicle. A hydraulic pump is bolted on to each driven wheel, using the existing mounting and a simple adapter. A compatible hydraulic motor is bolted on to each wheel to be driven and coupled to one of the pumps with a closed fluid system. Each pump and motor has a simple fluid operated mechanism for positive engagement with or disengagement from the respective wheel, the mechanism being actuated by a control valve accessible to the vehicle driver. When not in use the auxiliary drive is completely disconnected and stationary and does not impose any drag on the vehicle, or interfere with normal performance.

The primary object of this invention, therefore, is to provide a new and improved hydraulic auxiliary drive for vehicles.

It is another object of this invention to provide a new and improved hydraulic auxiliary drive which is adaptable to existing vehicles with a minimum of modification and without interfering with normal operation.

It is another object of this invention to provide a new and improved hydraulic auxiliary drive having a self-contained and closed fluid system, with internal fluid actuated means for engaging and disengaging the drive.

It is another object of this invention to provide a new and improved hydraulic auxiliary drive, with means for selectively applying auxiliary power to the vehicle or to a trailer towed by the vehicle.

Other objects and many advantages of this invention will become more apparent upon a reading of the following detailed description wherein like reference numerals designate like parts throughout and in which.

DESCRIPTION OF THE PREFERRED EMBODIMENT

Figure 1:
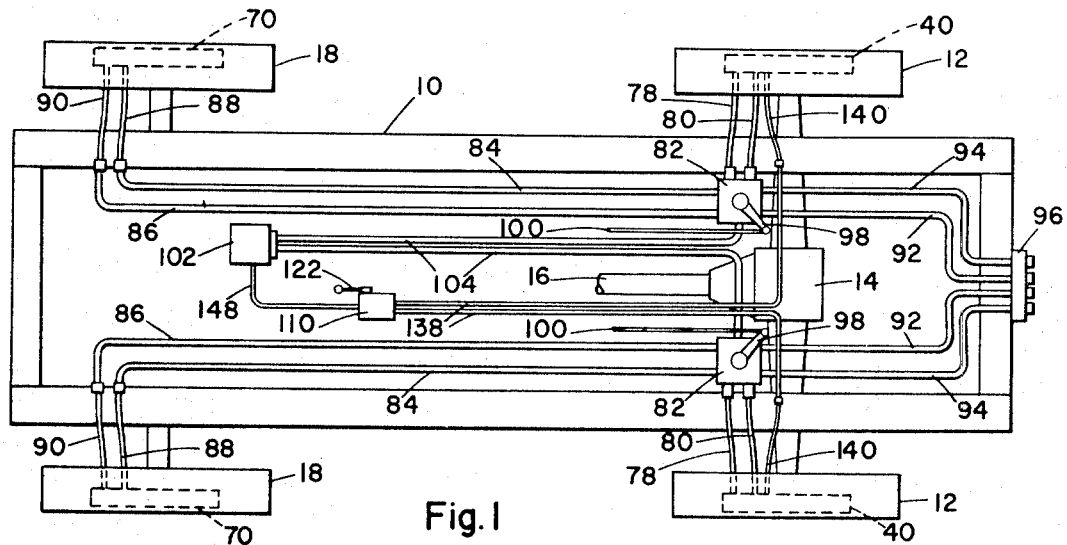
FIG. 1 is a diagrammatic top plan view of the system installed on a vehicle chassis.
Figure 2:
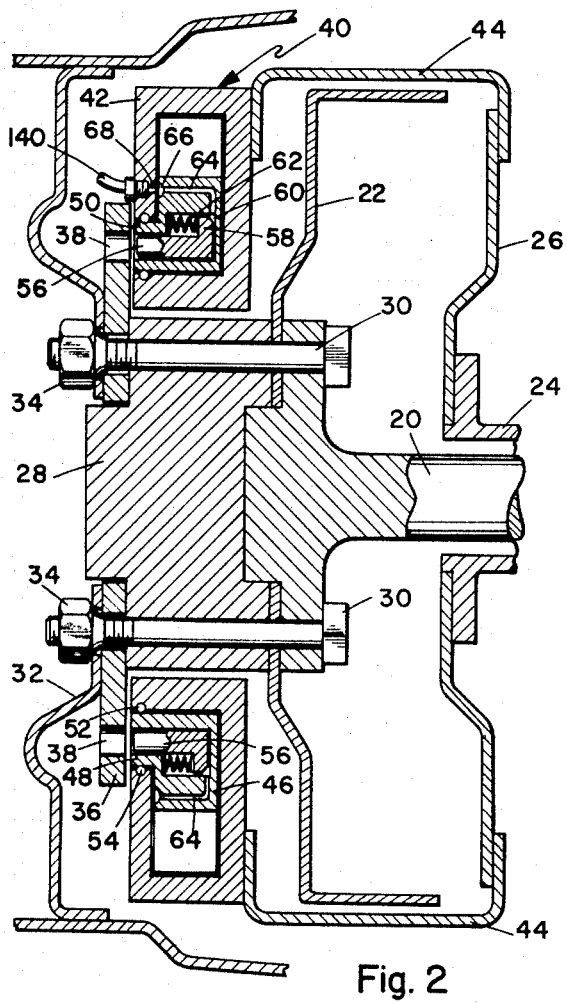
FIG. 2 is an enlarged diametrical section of a driven wheel, illustrating the hydraulic pump mounting.

A typical vehicle chassis 10 is shown in diagrammatic form in FIG. 1, with rear wheels 12 coupled through a differential unit 14 to a drive shaft 16, and non-driven front wheels 18. In FIG. 2, the rear wheel structure is shown to include an axle 20 to which is secured a brake drum 22, the axle rotating within a housing 24 which carries a backing plate 26. Conventional brake shoe mechanism, not shown, is mounted on the backing plate which remains stationary. The structure, with the exception of the backing plate attachment, is generally applicable to the front wheels also.

Each rear wheel assembly is provided with a hub extending adapter 28, with lengthened studs 30 passing through the adapter. The wheel frame 32 is secured on the extended studs by the usual lug nuts 34, and is thus mounted slightly outboard of its normal position. Secured between the wheel frame and adapter 28 is a drive disc 36, having a plurality of sockets 38 near the periphery. Concentric with the adapter 28 is a pump unit 40, having a cylindrical ring housing 42 which is supported from backing plate 26 by support members 44. Any suitable arrangement of bolts or other such fasteners may be used to make the pump unit detachable for access to the brake mechanism. In the housing 42 is a ring-like rotor 46, having a bearing flange 48 projecting from one face around the inner periphery. The bearing flange 48 rides in an annular channel 50 in the outboard face of housing 42, and is held between inner and outer sealed bearings 52 and 54. Pump unit 40 may be a gear type, vane type, or other suitable hydraulic pump configuration, so no specific structure has been shown for the rotor 46.

Mounted in the rotor 46 are drive pins 56 which can extend from bearing flange 48 and are spaced to fit into the sockets 38 of drive disc 36. Each drive pin has a head 58 which slides in a chamber 60, and is biased inwardly to the retracted position by a spring 62. The drive pin is extended by fluid pressure supplied through a duct 64 which enters the chamber 60 on the opposite side of head 58 from spring 62. All ducts 64 connect to an annular groove 66 in the outboard face of rotor 46, the groove being aligned with a pressure inlet 68 in housing 42.

Figure 3:
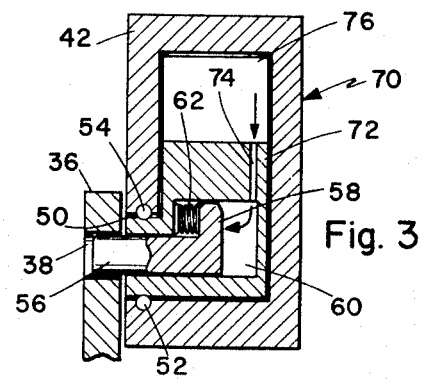
FIG. 3 is a further enlarged sectional view, similar to a portion of FIG. 2, but showing the drive engaging means for the hydraulic motor unit.
Figure 4:
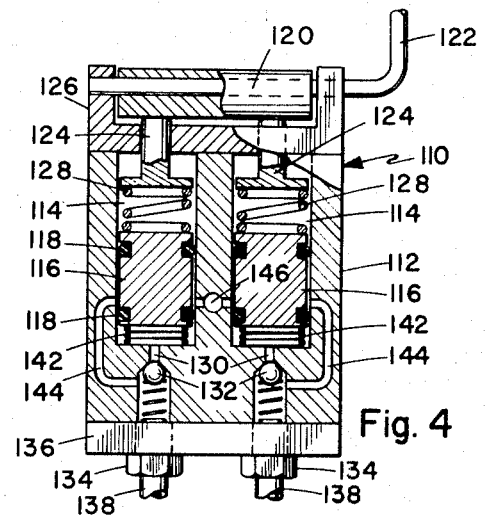
FIG. 4 is an enlarged view, partially cut away, of the drive control valve.

In each front wheel 18, a hydraulic motor 70 is mounted in a manner similar to pump 40. The motor is substantially similar to the pump, including the drive pins 56 which engage sockets 38 in a drive disc 36, the similar parts being correspondingly numbered in FIG. 3. The difference lies in the rotor 72, in which the ducts 74 supplying actuating pressure to the drive pin chambers 60 lead from the pressure chamber 76 of the motor, rather than from an external source, as in the pump.

In the installation, each pump 40 is connected by flexible hoses 78 and 80 to a selector valve 82, from which a pressure line 84 and a return line 86 extend to the front wheel and are coupled to the associated motor 70 by flexible hoses 88 and 90, respectively. From selector valve 82 another pressure line 92 and return line 94 lead to a connecting block 96 mounted on the rear of the vehicle. By installing hydraulic motors in the wheels of a trailer to be towed by the vehicle, the trailer wheels can also be driven by coupling their motors to connecting block 96. Hydraulic fluid would have to be added to fill the system when a trailer is coupled and, when not in use, the connections on the connecting block would be capped to prevent leakage. The selector valve 82 is a conventional two-way valve capable of switching the hydraulic connections from the pump to either the vehicle or the trailer. Each selector valve has an actuating lever 98 connected by a control rod 100 to suitable driver operated control means, not shown. Fluid level in the system is maintained from a reservoir 102, which is illustrated as being connected by supply lines 104 to the selector valves 82, but could be connected to any other convenient point in the system.

The system is operated by control valve 110 mounted for convenient access to the driver. Control valve 110 comprises a body 112 with a pair of parallel cylindrical chambers 114, in which are slidable valve elements 116 with O-ring seals 118. The valve elements are actuated by a cam 120 on a lever 122, the cam driving a pair of pistons 124 mounted in an end cap 126 of the valve body. Load springs 128 between the pistons 124 and valve elements 116 apply a controlled pressure to drive fluid out through ports 130 and past check valves 132, to outlets 134 in a cap 136 on the other end of the body. Outlets 134 are connected by pressure lines 138 and flexible hoses 140 to the pressure inlets 68 of the hydraulic pumps 40. Return springs 142 lift the valve elements 116 when the cam 120 is released, allowing fluid to bleed back through ducts 144 around the check valves 132 and through an exhaust outlet 146, which is connected to reservoir 102 by a return line 148.

The fluid system is a completely closed circuit and all air is eliminated. With the auxiliary drive inoperative, the pumps and motors are stationary and have no coupling with the wheels, so there is no drag on the normal drive means. To actuate the system, lever 122 is moved to depress valve elements 116 and cause fluid pressure to be applied to drive pins 56 in the pumps 40. The drive pins are extended and engage sockets 38 in drive discs 36, so coupling the rotors 46 to the driven wheels 12. Pumps 40 apply pressure to motors 70, the initial pressure causing drive pins 56 to be extended and engage the drive discs, coupling the motors to the front wheels 18. The front wheels are thus driven by direct hydraulic coupling to the rear wheels, all four wheels being driven at the same speed, in forward or reverse direction.

To disengage the four wheel drive, lever 122 is moved to release cam 120 and allow valve elements 116 to be lifted by return springs 142. Pressure is then relieved through ducts 144 and exhaust port 146, allowing all the drive pins 56 to be retracted by their springs 62 and disconnect the drive couplings with the wheels. Since the system is closed and the fluid volume constant, the hydraulic fluid itself can be used for the control operation. The valve unit 110 is designed so that the displacement of valve elements 116 is essentially equal to the total displacement volume of all the drive pin chambers. Drive engagement is thus maintained as long as cam 120 holds the valve elements depressed, avoiding the necessity for separate control means and possible leakage. The load springs 128 and drive pin return springs 62 prevent occurrence of a hydraulic lock which could overload the system.

Having described my invention, I now claim.

1. A hydraulic auxiliary drive system for a vehicle having driven wheels and non-driven wheels, the system comprising:
    a hydraulic pump mounted on each of said driven wheels;
    a hydraulic motor mounted on each of said non-driven wheels;
    closed fluid conducting circuit means interconnecting each pump with an associated motor on the same side of the vehicle;
    each pump and motor having a selectively operable driving connection with the respective wheel;
    and control means for selectively engaging and disengaging the driving connections of said pumps and motors with the respective wheels.

2. The system according to claim 1 and including:
    an external coupling connector block mounted on the vehicle with fluid conducting means connected to said pump;
    and a selector valve in said fluid conducting circuit means for selectively conducting fluid to said motor and said connecting block.

3. The system according to claim 1, wherein each of said pumps comprises a ring-like housing concentric with and fixed relative to the respective wheel, and a rotor in said housing;
    a drive disc secured to the wheel to rotate therewith and having sockets therein;
    and said control means including drive pins connected to said rotor, and means to extend said drive pins to engage said sockets and couple the rotor and drive disc.

4. The system according to claim 3, wherein said drive pins are slidably mounted in said rotor and biased to retracted position therein;
    said means to extend comprising fluid pressure means coupled to the fluid in said pump for extending said drive pins;
    and actuating means for applying initial pressure to the fluid in said pump to extend the drive pins.

5. The system according to claim 4, wherein said actuating means includes a control valve in said closed fluid conducting circuit means, said valve having piston means movable to displace sufficient fluid in the closed circuit to hold said drive pins in extended position.

6. The system according to claim 5, wherein each of said motors comprises a ring-like housing concentric with and fixed relative to the respective wheel and a rotor in said housing;
    a drive disc secured to the wheel to rotate therewith, and having sockets therein;
    and said control means including drive pins connected to said rotor, and means to extend said drive pins to engage said sockets and couple the last mentioned rotor and the associated drive disc.

7. The system according to claim 6, wherein said last mentioned drive pins are slidably mounted in the motor rotor and biased to retracted position therein;
    said means to extend comprising fluid pressure means coupled to the fluid in said motor.

8. The system according to claim 1, wherein said closed fluid conducting circuit means has a constant volume of fluid completely filling the circuit;
    said driving connections being operable by fluid pressure in the circuit for coupling said pumps and motors with the respective wheels;

said control means including actuating means for applying initial pressure in the circuit, comprising a control valve in the circuit having piston means movable to displace a volume of fluid sufficient to engage said driving connections.

9. The system of claim 8, wherein said control valve is coupled to said pumps to actuate the drive connecting means therein, the drive connecting means in said motors being actuated by fluid pressure generated therein by said pumps.

10. The system according to claim 8, and including a lever connected to said piston means for holding the same in the pressurizing position.

* * * * *